Figure 1:
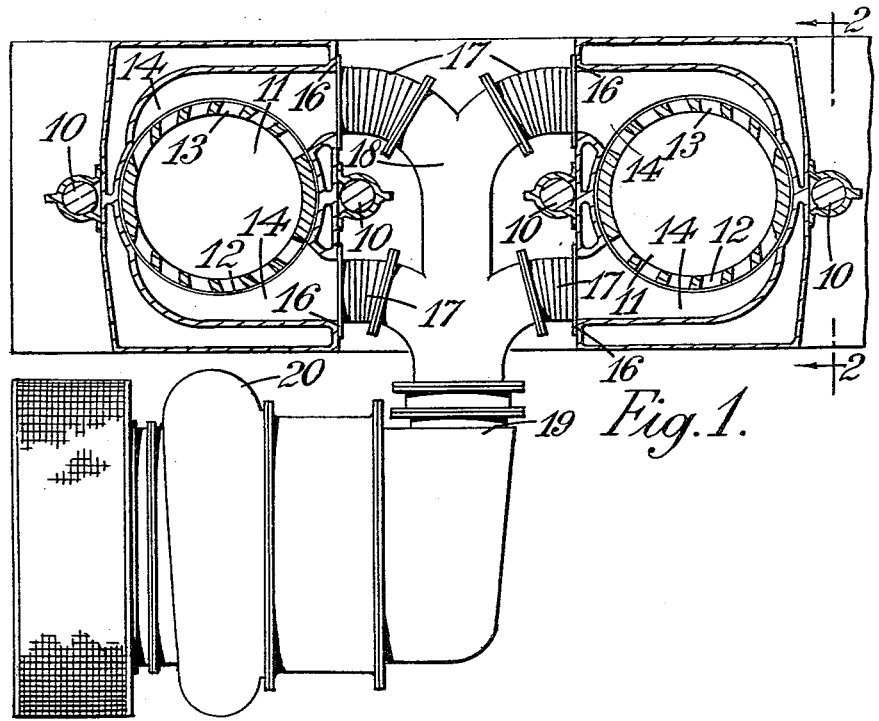

Aug. 28, 1962

P. JACKSON ETAL 3,051,147

EXHAUST MEANS FOR MULTI-CYLINDER MULTIPLE
PISTON INTERNAL COMBUSTION ENGINES

Filed April 28, 1958

4 Sheets-Sheet 1

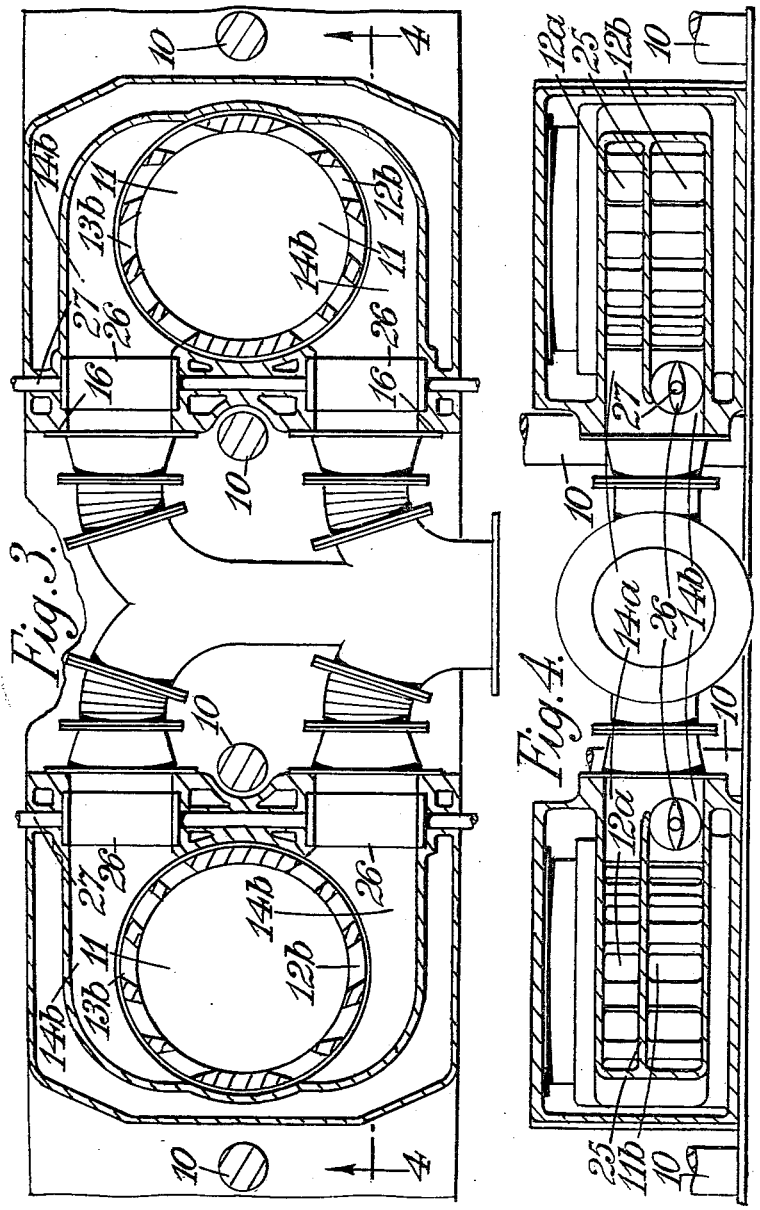

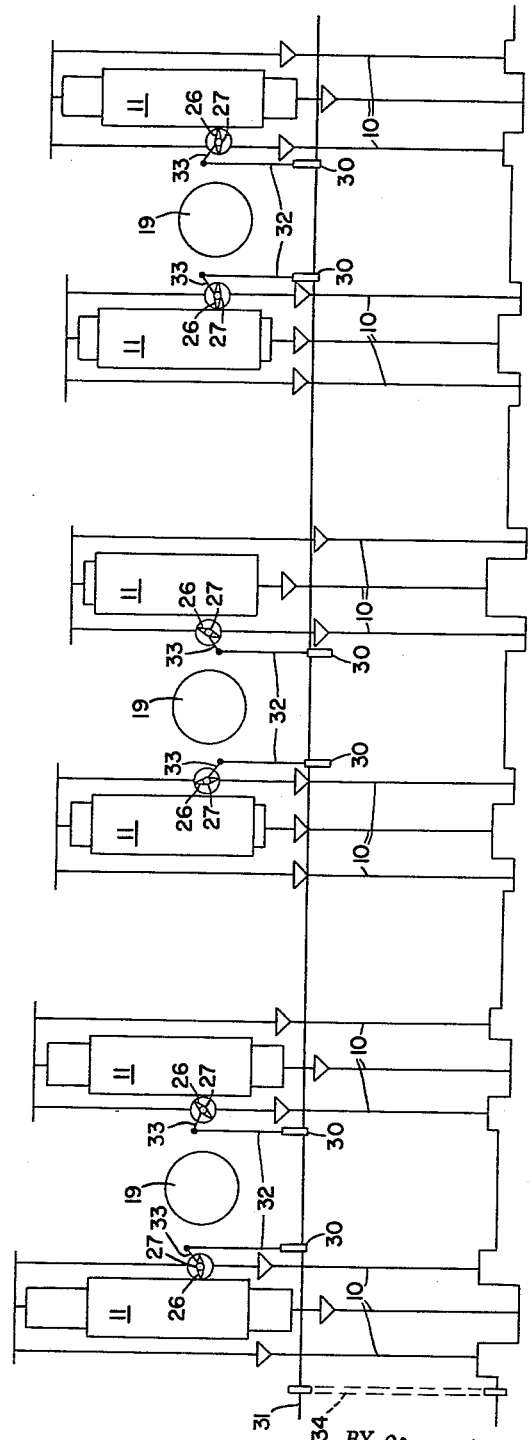

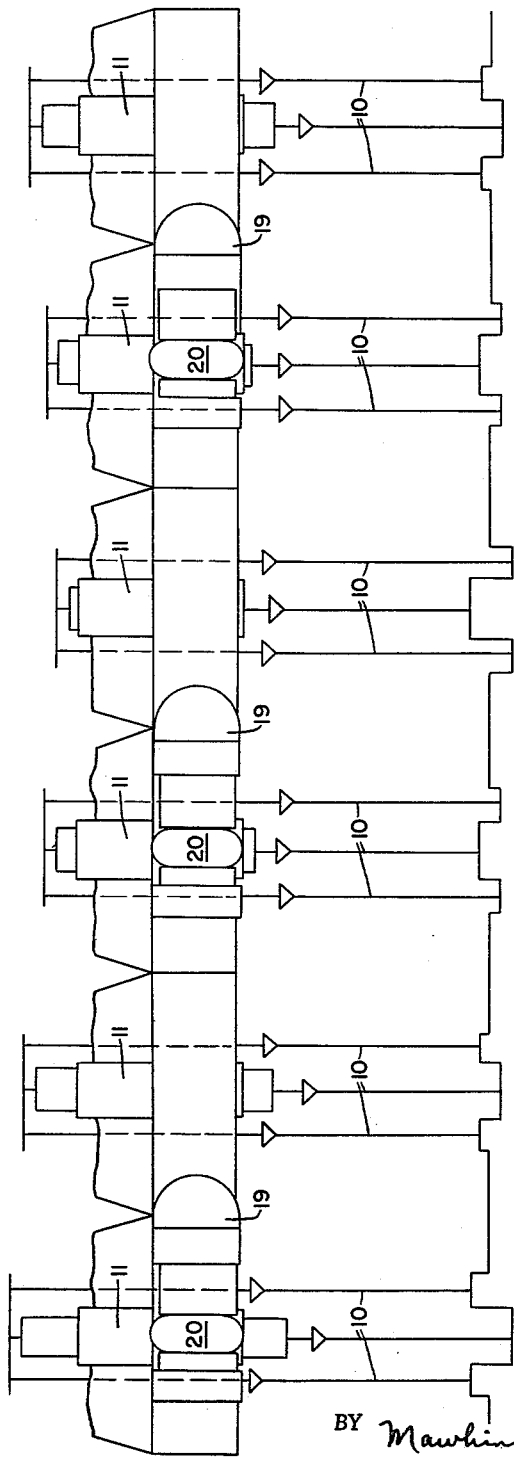

United States Patent Office 3,051,147
Patented Aug. 28, 1962

3,051,147
EXHAUST MEANS FOR MULTI-CYLINDER MULTIPLE PISTON INTERNAL COMBUSTION ENGINES
Percy Jackson and Ernest Taylor, Pallion, Sunderland, England, assignors to William Doxford & Sons (Engineers) Limited, Pallion, Sunderland, England, a British company
Filed Apr. 28, 1958, Ser. No. 731,237
Claims priority, application Great Britain Apr. 26, 1957
2 Claims. (Cl. 123—51)

The invention relates to multi-cylinder, in-line, two-stroke cycle, diesel engines and is concerned with improvements in the exhaust systems of such engines.

According to the invention an engine of the above kind is characterised by the feature that the exhaust from an adjacent pair of cylinders is taken to a common outlet pipe or conduit passing between the cylinders.

The common outlet pipe may lead direct to an exhaust turbine situated alongside the engine and, in the case of an engine having two or more pairs of cylinders, there may be one turbine for each pair. The turbine or turbines may be arranged to drive a blower or blowers for combustion and/or scavenge air or other purposes. It is an advantage of the invention, when applied to engines having exhaust turbines that, in relation to previous constructions, the loss of energy in the exhaust gases is reduced and additional energy is made available in the exhaust gases for operation of the turbines.

The invention is especially applicable to engines of the kind having opposed pistons and may with advantage be applied to such engines in which the two pistons of each cylinder are connected to a common crankshaft, that piston which is remote from the crankshaft having two side-connecting rods which pass alongside the cylinder one on each side thereof so that between each pair of cylinders there are two such side rods, one for each cylinder of the pair. It is preferred, when the invention is applied to an engine of this construction, that the common exhaust outlet passes between the side rods of the two cylinders.

According to a preferred feature of the invention there are two exhaust passageways from each cylinder to the common outlet, one passageway on each side of the engine. The outlet may, for example, be constructed as a pipe of double Y form with, preferably, expansion pieces in the joints to the cylinders.

In one construction according to the invention embodying the feature just mentioned each cylinder has two sets of exhaust ports opening to each passageway, the two sets being covered and uncovered by one of the pistons and one set being further from the end of the cylinder than the other (i.e. is uncovered earlier by the piston and is covered later in the cycle than the other set) and, for each cylinder, there are two butterfly valves in the passageways for controlling the sets of ports which are further from the end of the cylinder, the two valves being carried on a single operating shaft extending transversely of the engine. The shaft is arranged to be rotated or oscillated by any suitable means (e.g. by chain or push rod or gearing on either side of the engine, from the camshaft) and in timed relation with the engine to close the valves at the end of exhaust discharge to permit supercharging of the cylinder without undue loss of air through the ports.

Figure 2:
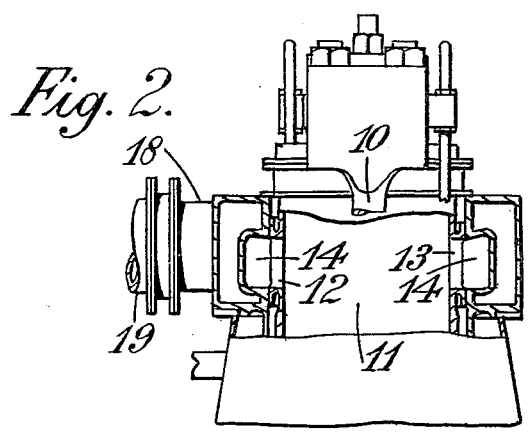

Two specific constructions of opposed piston two-stroke cycle engines embodying the invention will now be described by way of example and with reference to the accompanying drawings which are to some extent diagrammatic and in which:

FIGURE 1 is a plan view showing two cylinders of one of the engines and an exhaust driven turbo-blower associated therewith, the cylinders being shown in section, FIGURE 2 is a view on the line 2—2 in FIGURE 1, part of the cylinder being broken away, FIGURE 3 is a plan view showing two cylinders and associated parts of the second engine, the cylinders being shown in section, FIGURE 4 is a section on the line 4—4 in FIGURE 3 showing the exhaust ports at one side of the cylinders and the associated exhaust conduits, FIGURE 5 is a general view of the engine layout, and FIGURE 6 is a diagrammatic view of an engine modified as shown in FIGURES 3 and 4.

In each of the examples the engine has six upright cylinders with air inlet ports at the lower ends thereof and exhaust ports at the upper ends, the ports being covered and uncovered by the two pistons respectively. The upper piston of each cylinder is connected to the crankshaft, in well known manner, by means which include two vertical side rods 10 on the centre line of the engine. For each engine the exhaust arrangements, which constitute the present invention, are the same for each of the three pairs of adjacent cylinders and the arrangement of only one pair is shown in the drawings and will be described.

Referring first to the engine shown in FIGURES 1, 2 and 5, each cylinder 11 of the pair has exhaust ports 12 on one side of the engine and exhaust ports 13 on the other side. The ports 12 open into a passage or exhaust belt 14 cast in the cylinder block and leading in a tangential direction towards the other cylinder of the pair. Likewise the ports 13 open into a similar passage or exhaust belt 14. These passageways terminate in attachment facings or flanges 16, the two pairs of flanges on each side of the engine being in opposed, spaced relation. Connected between the opposed flanges 16 and through the medium of expansion pieces 17 there is a pipe 18 of double Y form, the stem of the pipe being horizontal and transverse to the engine and the four arms being connected respectively to the four flanges. The stem leads directly into the inlet 19 of an exhaust turbine which drives a blower 20 for supplying air to the two cylinders.

The construction of the engine shown in FIGURES 3 and 4 is similar to that just described, with the following modifications and additions. The exhaust ports in each cylinder are divided into two sets one below the other (i.e. one set 12b, 13b further from the end of the cylinder than the other set 12a, 13a) and the passageways are divided in the region of the exhaust ports by a horizontal partition 25 into two sections 14a, 14b which open into one another before the flange 16 is reached. In each lower section 14b there is a butterfly valve 26 and the two valves of each cylinder are carried on a common horizontal transverse shaft 27 by which the valves may be rotated or oscillated to open and close the outlet 14b from the lower set 12b of ports independently of the upper ports 12a. In use the valve is opened to allow free escape of the exhaust when the ports 12b are first uncovered by the upper piston and closed in time to prevent undue escape of supercharging air after completion of exhaust.

The shafts 27 are operated by cams 30 on the camshaft 31 through push rods 32 and lever arms 33. The camshaft is driven from the crankshaft by a chain drive 34.

The construction according to the invention has the advantages that it reduces to a minimum the throttling of the exhaust gases caused in previous constructions by the obstruction from the side rods, that the connections to the turbines are short and of small volume so that the loss of impulse energy is reduced and, in the second example, a particularly simple valve construction is provided. The construction also has advantages particularly in shortness of pipes and simplicity, over prior proposals in which exhaust connections are taken from the two sides of the engine independently or from one side with, for each cylinder individually, passages in the exhaust belt leading from the other side.

It is not essential that each pair of cylinders has its own turbine. The exhaust outlets from each pair may be taken to a common conduit leading to a single turbine.

In the case of an engine having an odd number of cylinders (e.g. 5 or 7), the odd cylinder may have its own, small, exhaust turbine, the other cylinders being coupled in pairs to turbines as above described.

We claim:

1. A multi-cylinder, in-line, two stroke cycle diesel engine having in each cylinder two opposed pistons working in opposite end portions of the cylinder, a crankshaft common to all the cylinders and extending lengthwise of the line of cylinders at a position opposite to the same ends of all the cylinders, said shaft having three crank throws for each cylinder, connecting rod means connecting the piston in the end of each cylinder which is opposite to the crankshaft to the center one of the three throws for that cylinder, means which include two side connecting rods which lie alongside the cylinder connecting the other piston to the other two throws of the crankshaft, there being two such side rods between each pair of adjacent cylinders one for each cylinder of the pair, and each cylinder of the pair has exhaust ports extending around arcuate portions of the cylinder diametrically opposed on opposite sides of the line of cylinders and each subtending an angle of more than 90°, and exhaust outlet connections from said exhaust ports to an exhaust pipe extending transversely of the cylinder axis between the said pair of cylinders.

2. A multi-cylinder, in-line, two stroke cycle diesel engine having in each cylinder two opposed pistons working in opposite end portions of the cylinder, a crankshaft common to all the cylinders and extending lengthwise of the line of cylinders at a position opposite to the same ends of all the cylinders, said shaft having three crank throws for each cylinder, connecting rod means connecting the piston in the end of each cylinder which is opposite to the crankshaft to the center one of the three throws for that cylinder, means which include two side connecting rods which lie alongside the cylinder connecting the other piston to the other two throws of the crankshaft, there being two such side rods between each pair of adjacent cylinders, one for each cylinder of the pair, at least one exhaust pipe extending transversely of the cylinder axes between a pair of adjacent cylinders, each cylinder of the pair having two sets of exhaust ports controlled by one of the pistons by covering and uncovering of the ports, one set being further from the outer end of the cylinder portion in which the piston works than the other set, exhaust outlets from the pair of cylinders connected to the said exhaust pipe on each side of the line of cylinders, and, for each cylinder, two valves in the exhaust outlets for further controlling the exhaust discharge through the ports which are further from the cylinder end, the two valves being operated by the engine in timed relationship therewith to close the valves at the end of the exhaust discharge.

References Cited in the file of this patent

UNITED STATES PATENTS

| | | |
|---|---|---|
| 1,525,971 | Winquist | Feb. 10, 1925 |
| 2,077,457 | Bronander | Apr. 20, 1937 |
| 2,139,425 | Steiner | Dec. 6, 1938 |
| 2,228,473 | Maxwell | Jan. 14, 1941 |
| 2,434,584 | Purdie | Jan. 13, 1948 |
| 2,611,349 | Parrish | Sept. 23, 1952 |
| 2,644,295 | Peterson | July 7, 1953 |

FOREIGN PATENTS

| | | |
|---|---|---|
| 564,693 | Great Britain | Oct. 9, 1944 |
| 569,270 | Great Britain | May 15, 1945 |
| 128,176 | Australia | July 1, 1948 |
| 83,101 | Netherlands | Oct. 15, 1956 |